US011865502B2

(12) United States Patent
Kinnen et al.

(10) Patent No.: US 11,865,502 B2
(45) Date of Patent: Jan. 9, 2024

(54) SYSTEMS AND METHODS FOR PAINT TINTING

(71) Applicant: SWIMC LLC, Cleveland, OH (US)

(72) Inventors: Andrew Kinnen, Cleveland, OH (US); Gustavo A Morales, Cleveland, OH (US); Owen J O'Donnell, Cleveland, OH (US); Daniel A Sherwin, Cleveland, OH (US)

(*) Notice: Subject to any disclaimer, the term of this patent is extended or adjusted under 35 U.S.C. 154(b) by 453 days.

(21) Appl. No.: 15/955,140

(22) Filed: Apr. 17, 2018

(65) Prior Publication Data

US 2018/0296995 A1 Oct. 18, 2018

Related U.S. Application Data

(60) Provisional application No. 62/486,292, filed on Apr. 17, 2017.

(51) Int. Cl.
*B01F 33/84* (2022.01)
*G06Q 20/18* (2012.01)
*G07F 13/06* (2006.01)
*B01F 101/30* (2022.01)

(52) U.S. Cl.
CPC ........ *B01F 33/8442* (2022.01); *B01F 33/846* (2022.01); *B01F 33/848* (2022.01); *G06Q 20/18* (2013.01); *G07F 13/06* (2013.01); *B01F 2101/30* (2022.01)

(58) Field of Classification Search
CPC .............. B01F 13/1055; B01F 13/1061; B01F 13/1063; B01F 33/846
USPC ....................................................... 366/605
See application file for complete search history.

(56) References Cited

U.S. PATENT DOCUMENTS

| | | | | |
|---|---|---|---|---|
| 5,083,591 A | * | 1/1992 | Edwards | B01F 15/00428 141/9 |
| 5,268,849 A | * | 12/1993 | Howlett | B01F 13/1055 141/103 |
| 6,563,510 B1 | * | 5/2003 | Rice | G01J 3/463 345/589 |
| 6,959,284 B1 | * | 10/2005 | Howes | G06Q 30/0601 705/26.5 |
| 6,991,004 B2 | | 1/2006 | Kaufhold et al. | |
| 7,571,122 B2 | * | 8/2009 | Howes | G06Q 30/0601 705/26.1 |
| 8,936,390 B2 | * | 1/2015 | Hughes | B08B 3/02 366/162.1 |
| 9,399,204 B2 | | 7/2016 | Milhorn | |
| 9,639,983 B2 | * | 5/2017 | Buzyn | G06Q 30/0621 |
| 11,030,670 B2 | * | 6/2021 | Caruso | G06Q 30/0621 |
| 2005/0099630 A1 | * | 5/2005 | Reynolds | G06F 16/2455 356/402 |

(Continued)

FOREIGN PATENT DOCUMENTS

| | | |
|---|---|---|
| WO | 2010015925 | 2/2010 |
| WO | 2011059506 | 5/2011 |

OTHER PUBLICATIONS

Oxford English Dictionary, online edition, definition of "kiosk", Mar. 2023.*

(Continued)

*Primary Examiner* — David L Sorkin
(74) *Attorney, Agent, or Firm* — BakerHostetler

(57) ABSTRACT

Systems and methods include self-service and automated components for paint tinting.

6 Claims, 10 Drawing Sheets

(56) References Cited

U.S. PATENT DOCUMENTS

| | | | | |
|---|---|---|---|---|
| 2005/0100210 A1* | 5/2005 | Rice | ............... | G06Q 30/02 |
| | | | | 382/162 |
| 2005/0102349 A1* | 5/2005 | Rice | ............... | G07F 9/02 |
| | | | | 709/201 |
| 2005/0165705 A1* | 7/2005 | Lauper | ............... | G06Q 30/06 |
| | | | | 705/500 |
| 2006/0001677 A1* | 1/2006 | Webb | ............... | G01J 3/526 |
| | | | | 345/594 |
| 2008/0262980 A1* | 10/2008 | Weiss | ............... | A63H 17/002 |
| | | | | 705/500 |
| 2009/0099695 A1* | 4/2009 | Trevino, III | ............... | B44D 3/08 |
| | | | | 700/265 |
| 2009/0228143 A1 | 9/2009 | Hughes et al. | | |
| 2009/0310856 A1* | 12/2009 | Korenkiewicz | ............... | C09D 7/80 |
| | | | | 382/165 |
| 2010/0067009 A1* | 3/2010 | Peterson | ............... | G01J 3/10 |
| | | | | 356/402 |
| 2011/0266337 A1* | 11/2011 | Reynolds | ............... | G06Q 30/06 |
| | | | | 235/375 |
| 2018/0117550 A1* | 5/2018 | Charles | ............... | G01J 3/50 |

OTHER PUBLICATIONS

PCT International Search Report, dated Sep. 20, 2018.
PCT Written Opinion of the International Searching Authority, dated Sep. 20, 2018.

\* cited by examiner

SYSTEMS AND METHODS FOR PAINT TINTING

This application claims priority to U.S. Provisional Patent Application 62/486,292 filed on Apr. 17, 2017, the entirety of which is incorporated herein by reference

CROSS-REFERENCE TO RELATED APPLICATION

This application claims the benefit of U.S. Provisional Patent Application No. 62/486,292, filed Apr. 17, 2017, which is incorporated by reference herein in its entirety.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright or rights whatsoever.

TECHNICAL FIELD

The present disclosure generally relates to paints, and more particularly relates to self-service paint tinting systems and methods.

BACKGROUND

Self-service is becoming a norm across a variety of industries. Airlines, groceries, and retail now utilize kiosks which have replaced representatives, cashiers, and other point-of-sale personnel. As self-service kiosks may reduce the need for consumers to wait in line, buyers may prefer self-service to legacy alternatives.

Self-service also reduces overall costs. For example, full-service gas stations employing live attendants pumping gas require payment of the attendant by the stations and frequently tipping by the purchaser. These practices increase costs and may slow associated processes. Self-service stations, on the other hand, require an initial technology investment but have a dramatically smaller marginal transaction cost.

SUMMARY

In an embodiment, one or more kiosks for self-service paint tinting are provided.

In an embodiment, a system for self-service paint tinting is provided.

In an embodiment, a method for self-service paint tinting is provided.

In an embodiment, a software program for self-service paint tinting is provided.

These and other embodiments are described in greater detail elsewhere herein. In some of the following descriptions a particular embodiment and its details are used to illustrate the disclosed aspects. The applicability of the method is not limited to the particular embodiments described herein.

BRIEF DESCRIPTION OF THE DRAWINGS

The accompanying appendices and/or drawings illustrate various non-limiting, example aspects in accordance with the present disclosure.

DETAILED DESCRIPTION

Aspects herein concern self-service paint tinting for consumers. To procure particular colors and shades of paint, consumers—ranging from, e.g., a builder requiring dozens of gallons to a homeowner who needs a few ounces for touch-ups—typically proceed to a location where paint is sold and interact with an associate or technician at the seller who will mix the paint to the buyer's specification. Aspects herein disclose systems and methods empowering the purchaser and reducing the labor and time spent providing the limitless combinations of colors and finishes available in the paint market. Such aspects can be implemented as one or more computers or computing elements and include varying levels of automation at one or more stations or kiosks.

Conventionally, paint is purchased by visiting a paint counter at a hardware store, staffed by a technician. These store sections frequently back up and require lengthy waits to receive a particular shade of paint. To avoid such delays or back-and-forth, paint users routinely buy arbitrary colors carried in volume, but such colors may not match their desired color or exist with preferred qualities (e.g., finish, water resistance, cleaning capability). However, to date, retailers have failed to provide technological improvements or recognize opportunities to improve the dated and, at times, customer-frustrating techniques associated with traditional paint counters.

Figure 1:
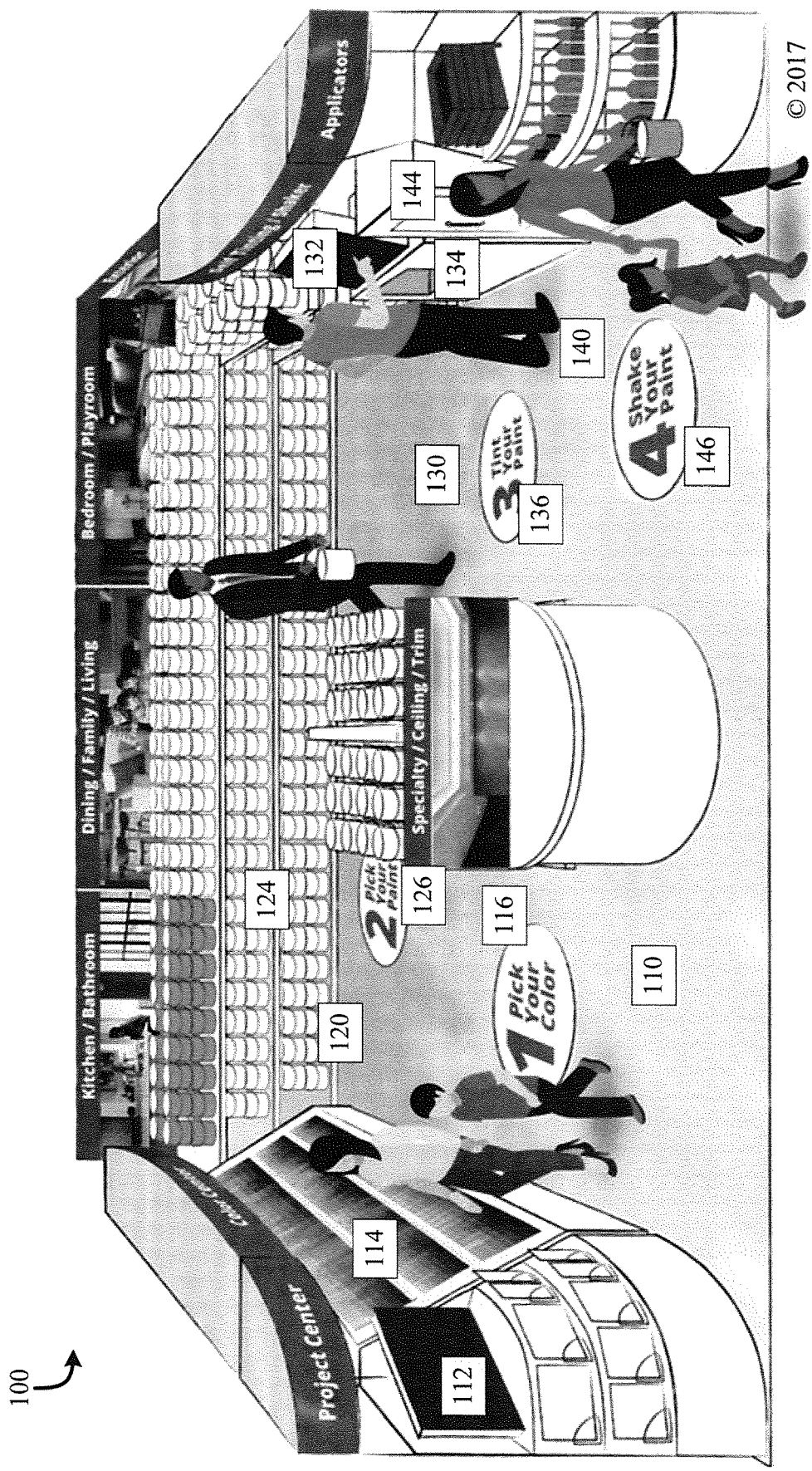
FIG. 1 is an illustration of an example system disclosed herein.

FIG. 1 illustrates an example system 100 for providing self-service tinting to consumers. System 100 includes color selection module 110, base selection module 120, tint module 130, and mix module 140. System 100 is shown in a layout managing flow and allowing multiple customers to interact with various steps of the paint tinting process simultaneously in a self-service manner.

Color selection module 110 provides consumers the opportunity to pick a color for the paint. A variety of selection aids can be provided in conjunction with color selection module 110. Color interface 112 can be provided to provide users information and in embodiments receive user input to assist with color selection, color matching, or determination of other information. In embodiments, color interface 112 can include various camera elements to match colors. In embodiments, color interface 112 can communicate with other interfaces or elements of system 100 to ensure the proper color is produced. Color selection module 110 can also include swatch system 114 which can include various colors that can be selected or compared for matching. In embodiments, swatches among swatch system 114 can be encoded (e.g., include a 2D or 3D barcode, radio frequency identification (RFID) tag, or others) to allow later scanning or detection to ensure the proper color is produced. In alternative or complementary embodiments, color information, such as a color number or identification (e.g., red-green-blue (RGB), cyan-magenta-yellow-key (CMYK), hex) can be provided on a swatch among swatch system 114 to allow for manual entry or communication of precise colors. Color selection module 110 also includes color signage 116 which provides guidance or instructions (which can be high-level or specific) to users regarding action in or at color selection module 110 and assist with understanding of the tinting process and flow.

Base selection module 120 allows users to select a base paint, or a base having a particular base quality. The base paint can provide the materials, qualities, finish, texture, gloss, et cetera, desired in combination with the selected colors. ("Base quality" is generally used to refer to any or all variables or characteristics of a base paint, or of paint generally other than color.) In the illustrated embodiments, base array 124 is provided to allow a consumer to manually pick pre-packaged base. Bases in base array 124 can include encoding or other information to identify a particular type of base among the array. Bases in base array 124 can also be provided in modified packaging (e.g., system- or user-friendly paint cans or containers which open and/or seal in a manner different than conventional paint cans) for greater interoperability with system 100. Base selection module 120 also includes base signage 126 which provides guidance or instructions (which can be high-level or specific) to users regarding action in or at base selection module 120 and assist with understanding of the tinting process and flow.

In embodiments base selection module 120 can also include an interface for providing information related to bases, and/or to receive user input. In embodiments, handling of a selected base can also be performed automatically by mechanisms or filling of a container with the selected base downstream in system 100 to ensure the intended base is provided.

Tint module 130 includes tint interface 132, tint mechanisms 134, and tint signage 136. Tint interface 132 allows a user to initiate tinting of the base. In embodiments, the intended color is received at tint interface 132 electronically based on a previous selection or action of system 100. In alternative or complementary embodiments, the color is selected or entered at tint interface 132 by detecting, scanning, or entering codes or information related to a selected color. In still further alternative or complementary embodiments, the color may be selected by trial-and-error or on-the-fly at tint interface 132.

After receiving a color selection, tint mechanisms 134 provide colorant for tinting the base. A base selected using base selection module 120 is provided automatically or manually to a tinting location where amounts of colorant are provided. Tint module 130 also includes tint signage 136 which provides guidance or instructions (which can be high-level or specific) to users regarding action in or at tint module 130 and assist with understanding of the tinting process and flow.

Mix module 140 includes mixing mechanisms 144 and signage 146. Mixing mechanisms 144 can include mechanisms for closing and sealing the tinted container of paint (e.g., applying a lid or confirming a lid is properly engaged), shaking the container, stirring the container, et cetera. In this regard, the final paint color can be evenly provided with the colorant mixed through the base. Mix module 140 also includes mix signage 146 which provides guidance or instructions (which can be high-level or specific) to users regarding action in or at mix module 140 and assist with understanding of the tinting process and flow.

In embodiments mix module 140 can also include an interface for providing information related to mixing, and/or to receive user input. In embodiments, mixing of a selected base and provided colorant can also be performed automatically by mechanisms operationally coupling tint module 130 and mix module 140. Further, an interface at mix module 140 can provide additional information, assist with checkout and payment, recommend applicators, painting equipment, accessories, or uses for the paint as-mixed, and so forth. In embodiments, an element of mix module 140 or downstream of mix module 140 can confirm, following mixing, that the base was correctly tinted by matching a sample from the mixed paint to the selected color (using, e.g., camera technology).

One or more of color selection module 110, base selection module 120, tint module 130, and/or mix module 140 can include various printers or other elements for carrying information. In embodiments, label printers are provided at one or more modules to allow for scanning of paint cans or other items. In alternative or complementary embodiments, other sensors can be provided or applied to assist with transmitting information through system 100.

While system 100 is illustrated as such for ease of explanation, it is understood that systems alternative or complementary to the embodiment illustrated are captured by the scope and spirit of the innovation. In an example, multiple interfaces can be provided at each module to allow multiple consumers to perform the same self-service aspects simultaneously. In another example, system layout can be linear (as opposed to horseshoe or circular as illustrated) or follow other paths (e.g., multi-aisle zig-zag). Additional interfaces, signage, or other aspects can be included in varying embodiments. Further, mobile application or device integration can be provided with system 100. In an example, an augmented reality display leveraging a device camera could be utilized with system 100, or device sensors could detect elements of system 100 in proximity to allow the user to control elements of system 100 or receive instructions related to elements of system 100 based on location therein.

Figure 2B:
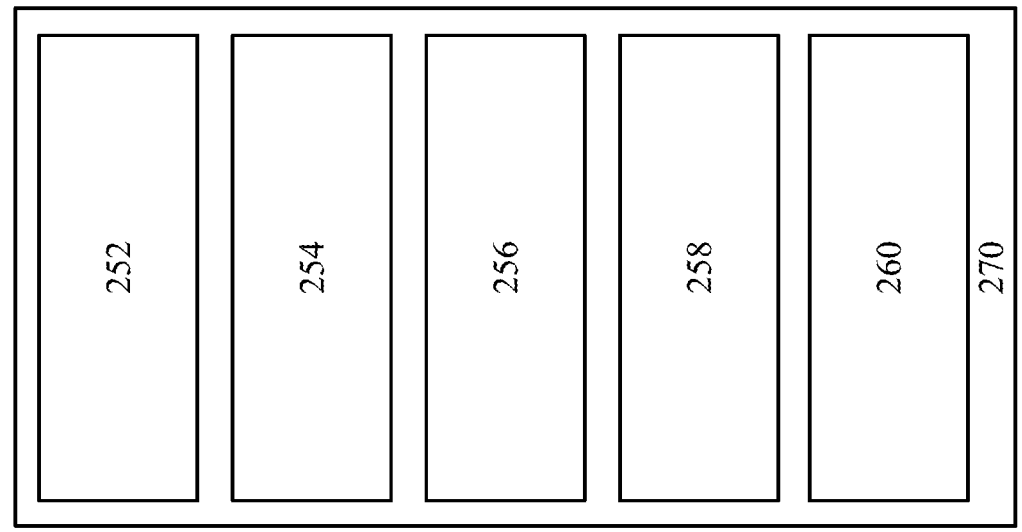
FIGS. 2A and 2B are block diagrams of example systems disclosed herein.
Figure 2A:
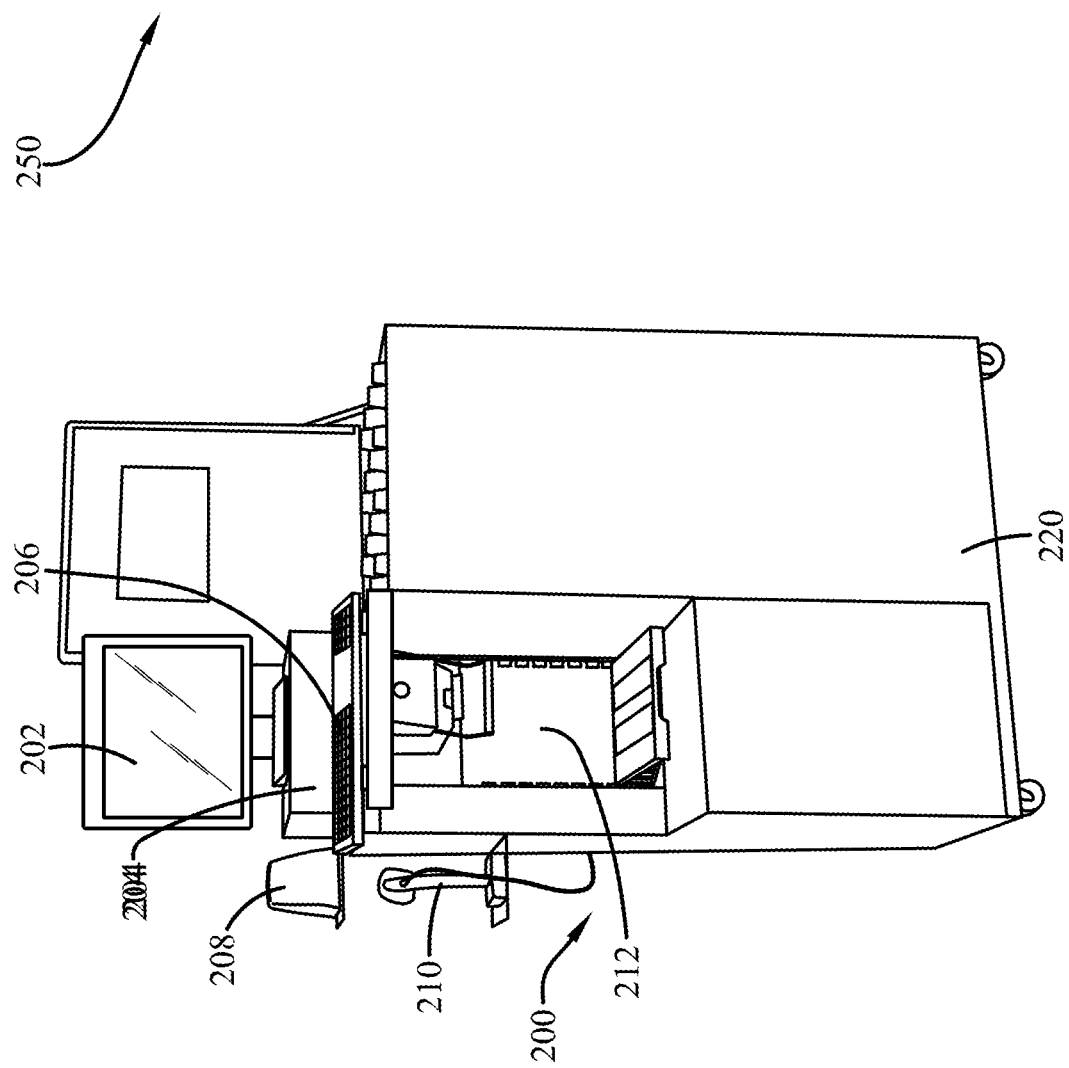

FIGS. 2A and 2B illustrate example systems 200 and 250 for providing self-service tinting to consumers. FIG. 2A illustrates an illustration of an example kiosk 200, while FIG. 2B illustrates a block diagram of an example kiosk 250.

Kiosk 200 includes user interface 202. User interface 202 is shown as a monitor, but can also include speakers, touch screens, and other input/output devices or elements. Computing device 204 is shown operatively coupled with user interface 202, and can provide logic and storage, or elements which interact with remote logic and storage, providing functionality disclosed herein. Keyboard 206 can function separately from or in conjunction with user interface 202, and may optionally also include a mouse, touchpad or touchscreen, trackball, joystick, et cetera. Printer 208 can be used to print labels, receipts, information sheets, and other items.

Sensor 210 can be used to input information from various elements including, in embodiments, 2D or 3D barcodes, RFID tags, and other aspects. In the illustrated embodiment sensor 210 can be a barcode reader or camera. Though it is illustrated as such, this should not be deemed limiting.

Mechanisms 212 can be provided to perform various actions related to paint containers. In embodiments, mechanisms 212 can seal or unseal a paint container. In embodiments, mechanisms 212 can shake or stir fluid in a paint container. In embodiments, mechanisms 212 can provide base paint or colorant into a container. Various embodiments of kiosk 200 can perform any number of paint-related tasks to provide self-service or automate processes associated with tinting paint.

Kiosk 200 also includes kiosk body 220, which can include the structural components supporting, retaining, arranging, and protecting the various elements of kiosk 200.

Kiosk 250 is a block diagram of an example kiosk and/or certain components which can be included in some (but not necessarily all) kiosks disclosed herein. Kiosk 250 include display and/or output 252, which provides visual, audible, or other information to users to provide self-service paint tinting. Kiosk 250 also includes input and/or sensors 254 which receives input to provide self-service paint tinting. Input and/or sensors 254 can include, e.g., a barcode scanner, mouse, touchscreen, keyboard, camera, RFID sensor, microphone, or other inputs.

Kiosk 250 also includes paint mechanisms 256. Paint mechanisms 256 can vary at one or more kiosks by level of automation and physical arrangement of tinting processes. One or more of paint mechanisms 256 in various embodiments can include providing a container, providing base paint, providing colorant, providing other additives, providing a top or lid, sealing the top or lead, unsealing the top or lead, mixing or shaking the container or its contents, retrieving a sample from the container, providing the sample, labeling the container, et cetera. Varying levels of automation can be implemented using logic 258 and various mechanical actuators configured to translate and rotate a paint vessel or other elements. Such mechanical automation could place a vessel (empty or containing a base), dispense paint components into the vessel (tint and/or base), seal the vessel (using, e.g., screw-on top(s), a traditional paint can lid), agitate or mix the tint and base (e.g., shaking when sealed, stirring before sealing, combinations thereof), print and apply labels, complete point-of-sale activity such as receiving and counting currency, et cetera. Peripheral aspects for safety or sanitation, such as deploying a shield or closing a door before mixing or shaking, can also be performed using paint mechanisms 256 and associated mechanical elements.

Kiosk 250 also includes logic 258. Logic 258 can be local or remote aspects for controlling tinting processes, providing information, and performing various other aspects using electronics 260. In an embodiment, logic 258 can include aspects for confirming that components used with kiosk 250 are genuine products (e.g., containers, base paints, colorants, additives). Kiosk 250 also includes electronics 260, which can include processors, memory, storage, network interfaces, et cetera, for completing and controlling various aspects described herein.

Kiosk 250 also includes kiosk housing or body 270, which can contain, retain, arrange, and protect various aspects of kiosk 250.

Kiosks such as kiosk 200 and kiosk 250 can be provided at one or more points of system 100, or may be a single-point device performing some or all aspects of system 100.

Various alternative and complementary aspects can be provided in view of the embodiments described above and elsewhere herein. In embodiments, existing tinting and/or mixing equipment can be utilized to minimize capital investments. Such utilization can include providing access and instructions to existing equipment, adding new controls for existing equipment, and/or retrofitting existing equipment to be interoperable with aspects disclosed herein.

In embodiments, technician-managed paint tinting processes can be transformed into a do-it-yourself, user-friendly, intuitive experience for providing desired paint colors.

In embodiments, a product brand can establish exclusivity in use of self-service tinting. Logic operating in or on systems can confirm authentic products are being utilized with the system during processes, and only function with authentic products and/or reject others.

In embodiments, a completely-branded experience can be provided to a user purchasing through self-service processes. Branded store areas, instructions and markers, kiosks, et cetera can immerse a consumer in the brand during the selling, preparation, and/or purchasing process(es).

In embodiments, new user-friendly packaging can be provided for use with self-service tinting apparatuses and processes. In embodiments, a twist-and-pour packaging system for paint (e.g., base, tint, other elements) is provided. In this regard, FIGS. 7A to 7E illustrate example aspects.

In embodiments, customer tracking and recall can be provided by self-service tinting apparatuses and methods. In embodiments, customer purchases, including specific colors and quantities, can be stored locally or remotely (e.g., in one or more paint information databases). In embodiments, order history and search functionality can be provided to users, sales personnel, or others.

Various embodiments can include one or more computerized interfaces. The interface(s) can include software for mixing paint or making selections related to paint. The interfaces can be a touch screen or tablet-based kiosk. Interfaces herein can be static or mobile (e.g., travel with the customer as a mobile app on their own device or a device of the paint seller). Software related to the interfaces can include "wizard"-type functionality following a linear or nonlinear process guiding users. Software related to the interfaces can allow modification of various paint parameters in any order, or in an un-ordered manner. Such software can be hosted or installed on various devices associated with the users or sellers. Interfaces can be groups of computer systems located in an area around a store, throughout a store, or outside a store. Aspects of the software can prioritize multiple requests from one or more interfaces (including apps and other network-based requests) to ensure the available tinting systems are utilized efficiently or according to urgency, timing, customer details, and so forth.

Further, one or more mechanisms, kiosks, stations, et cetera, can be configured to receive input from a remote device. The remote device can be a user device or dedicated store device. Examples can include mobile phones, tablets, laptop or desktop computers, et cetera. In an embodiment, remote sensor data can be provided to a component of system 100. For example, a store tablet can scan a paint swatch or capture an image of another product in the store to determine a color match which is transmitted to the kiosk. Alternatively, a user phone or device can take imagery from the user's home or another location to transmit to system 100. In embodiments, a device bearing appropriate sensors (e.g., cameras) can be controlled for location, angle, flash, et cetera, to aid in consistent, normalized image capture to facilitate color matching.

Parameters for various paint software and tinting machines include composite color, color values (e.g., Red-Green-Blue, Cyan-Magenta-Yellow-Key), matte/satin/glossy, surface for painting (e.g., material and two-dimensional area), amount of paint requested (may be provided or auto-calculated based on surface area to be painted), application method, primer use, previous color(s) of surface to be painted, et cetera.

In embodiments the base paint supply can be provided in various fashions. In an embodiment empty paint containers are provided and fluid conduits fill the container with base before, after, or during adding of colorant. In some such embodiments, systems can include reservoir(s) in fluid communication with tinting subsystem. In embodiments, base can be provided using (at least partially) filled paint containers with base paint therein. These can be inventoried or stored near tinting subsystem for automatic or manual handling. In embodiments systems can include automated means for placing base paint containers in tinting area. In embodiments systems can include indicators for manual placement of base paint containers in tinting area.

A tinting station or subsystem provides tinting pastes, powders, or other colorants for mixing with base paint. These can be provided using various conduits in communication with tinting subsystem. The tinting subsystem can receive base paint and colorants/tints to produce a requested color. The tinting subsystem can include actuators for dispensing paint components to provide the appropriate contents in a paint container for a specific color.

A mixing or shaking subsystem can receive a container from tinting subsystem to properly mix materials. This can be provided automatically or manually depending on mechanisms.

Aspects can further include one or more labeling subsystems which print labels related to paint colors produced, tints, and base paints. In embodiments, authentication labels or codes can be provided to ensure proper or genuine products are used. In embodiments a labeling subsystem can automatically label paint from systems or provide labels to be manually affixed.

Aspects can further include one or more scanning subsystems which can scan or identify (e.g., RFID, 2D/3D barcode, other machine vision) items used with system. These can be used to confirm genuine products (e.g., base paint or other elements authorized for use with system), provide codes which populate one or more pre-programmed colors, scan price tags or product identifications (and in embodiments communicate to a communicatively coupled checkout system), confirm labels produced by labeling subsystem, scan codes from empty cans to repeat previous order, and so forth.

Aspects can further include a matching subsystem for matching colors. The matching subsystem can include an input or camera component that receives a sample color to be matched (e.g., from a purchaser). In embodiments the matching subsystem can also receive a paint sample from paint produced by systems herein to confirm a match after paint is tinted and mixed. Such samples can be provided automatically by a mechanism or can be provided manually by a user (e.g., placing sample on a sample card or in a capture area). In an embodiment matching subsystem can include a capture area having an enclosure or shade to ensure consistent capture of samples. Matching subsystem can also include a comparison subsystem which analyzes and compares paint colors to describe the paint color in terms of values and determine matches. Comparison subsystem may identify changes (e.g., what colorant to add) to provide match in the event of mismatch to correct errors or minimize waste.

In embodiments input devices can include a microphone and aspects of self-service paint tinting can be conducted by voice control or providing audible signals or instructions.

In embodiments, one or more stations, kiosks, or functions can be consolidated into a single point or device. For example, all aspects described herein can be performed at a consolidated kiosk for selecting a paint color (to include matching functionality in embodiments), providing a base, tinting the base, mixing the paint, labeling the vessel, processing payment, et cetera. In alternative embodiments, the consolidation can leverage a remote device to perform certain aspects, such as selecting or payment, while elements which must necessarily be performed at the paint storage location are performed by a single point with which the customer interacts to receive and/or pay for their paint after completing aspects performed using the remote device.

Figure 3:
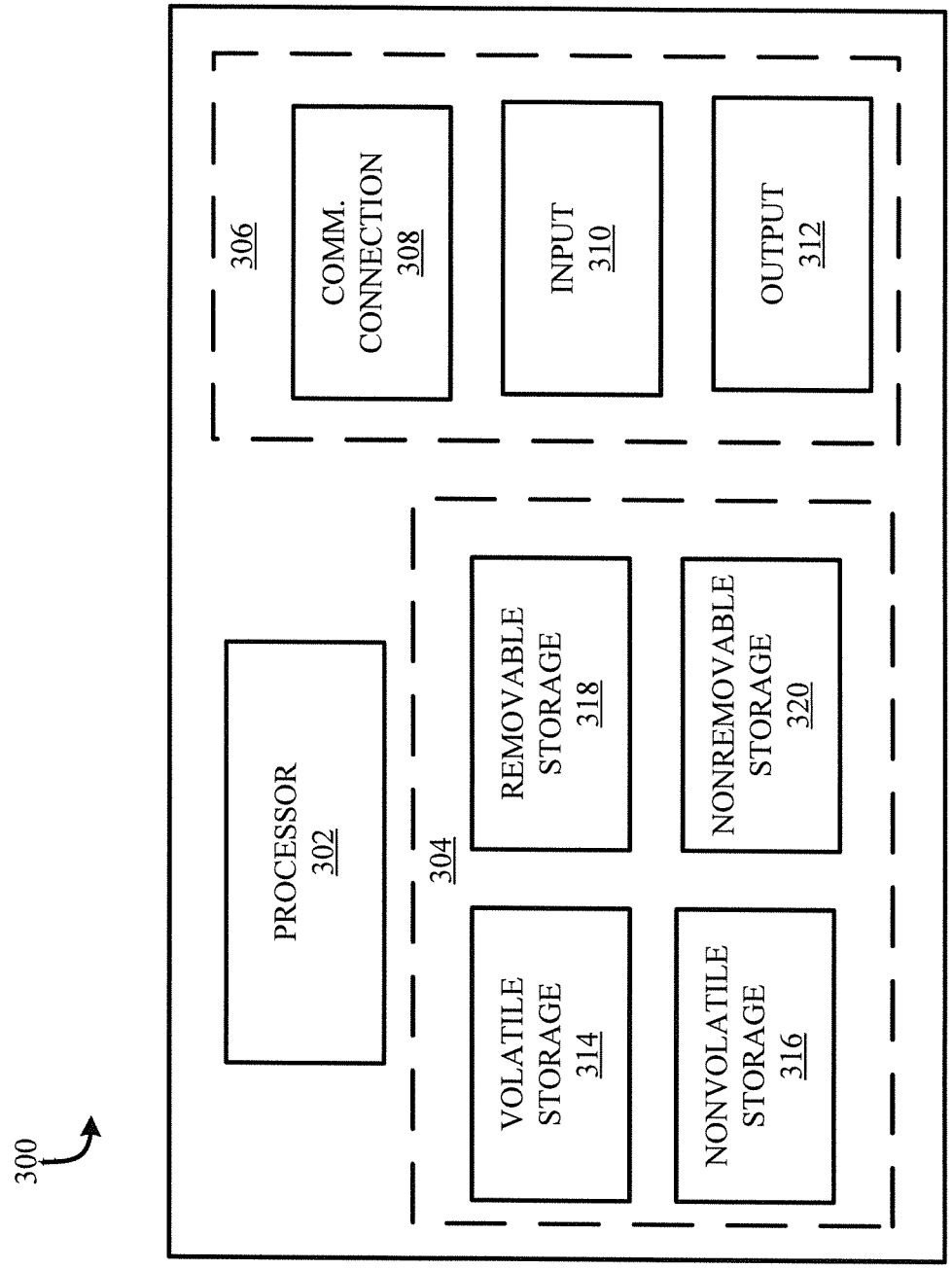
FIG. 3 is a block diagram illustrating an example implementation of an electronics device that may be used to implement at least a portion of the disclosures herein.

Turning to FIG. 3, device 300 may comprise all or a part of systems 100, 200, and/or 250. Device 300 may comprise hardware or a combination of hardware and software. The functionality to facilitate telecommunications via a telecommunications network may reside in one or a combination of more than one system. Device 300 depicted in FIG. 3 may represent or perform functionality of an appropriate device 300, or combination of systems 100, such as, for example, a component or various components of a computer or remote device, a wireless network, a processor, a server, a gateway, a node, or the like, or any appropriate combination thereof. It is emphasized that the block diagram depicted in FIG. 3 is exemplary and not intended to imply a limitation to a specific implementation or configuration. Thus, device 300 may be implemented in a single device or multiple devices (e.g., single server or multiple servers, single gateway or multiple gateways, single controller or multiple controllers). Multiple network entities may be distributed or centrally located. Multiple network entities may communicate wirelessly, via hard wire, or any appropriate combination thereof.

Device 300 may comprise a processor 302 and a memory 304 coupled to processor 302. Memory 304 may contain executable instructions that, when executed by processor 302, cause processor 302 to effectuate operations associated with, e.g., selecting or receiving paint tinting information, controlling electromechanical components, processing payment, and/or performing other aspects described herein. As evident from the description herein, device 300 is not to be construed as software per se.

In addition to processor 302 and memory 304, device 300 may include an input/output system 306. Processor 302, memory 304, and input/output system 306 may be coupled together (coupling not shown in FIG. 3) to allow communications there between. Each portion of device 300 may comprise circuitry for performing functions associated with each respective portion. Thus, each portion may comprise hardware, or a combination of hardware and software. Accordingly, each portion of device 300 is not to be construed as software per se. Input/output system 306 may be capable of receiving or providing information from or to a communications device or other network entities configured for telecommunications. For example input/output system 306 may include a wireless communications (e.g., WiFi/2.5G/3G/4G/GPS) card. Input/output system 306 may be capable of receiving or sending video information, audio information, control information, image information, data, or any combination thereof. Input/output system 306 may be capable of transferring information with device 300. In various configurations, input/output system 306 may receive or provide information via any appropriate means, such as, for example, optical means (e.g., infrared), electromagnetic means (e.g., RF, WiFi, Bluetooth®, ZigBee®), acoustic means (e.g., speaker, microphone, ultrasonic receiver, ultrasonic transmitter), or a combination thereof. In an example configuration, input/output system 306 may comprise a WiFi finder, a two-way GPS chipset or equivalent, or the like, or a combination thereof.

Input/output system 306 of device 300 also may contain communication connection 308 that allows device 300 to communicate with other devices, network entities, or the like. Communication connection 308 may comprise communication media. Communication media typically embody computer-readable instructions, data structures, program modules or other data in a modulated data signal such as a carrier wave or other transport mechanism and includes any information delivery media. By way of example, and not limitation, communication media may include wired media such as a wired network or direct-wired connection, or wireless media such as acoustic, RF, infrared, or other wireless media. The term computer-readable media as used herein includes both storage media and communication media. Input/output system 306 also may include an input device 310 such as keyboard, mouse, pen, voice input device, or touch input device. Input/output system 306 may also include an output device 312, such as a display, speakers, or a printer.

Processor 302 may be capable of performing functions associated with wired or wireless communication and control as described herein. For example, processor 302 may be capable of, in conjunction with any other portion of device 300, selecting or receiving paint tinting information, controlling electromechanical components, processing payment, and/or performing other aspects described herein.

Memory 304 of device 300 may comprise a storage medium having a concrete, tangible, physical structure. As is known, a signal does not have a concrete, tangible, physical structure. Memory 304, as well as any computer-readable storage medium described herein, is not to be construed as a signal. Memory 304, as well as any computer-readable storage medium described herein, is not to be construed as a transient signal. Memory 304, as well as any computer-readable storage medium described herein, is not to be construed as a propagating signal. Memory 304, as well as any computer-readable storage medium described herein, is to be construed as an article of manufacture.

Memory 304 may store any information utilized in conjunction with telecommunications. Depending upon the exact configuration or type of processor, memory 304 may include a volatile storage 314 (such as some types of RAM), a nonvolatile storage 316 (such as ROM, flash memory), or a combination thereof. Memory 304 may include additional storage (e.g., a removable storage 318 or a non-removable storage 320) including, for example, tape, flash memory, smart cards, CD-ROM, DVD, or other optical storage, magnetic cassettes, magnetic tape, magnetic disk storage or other magnetic storage devices, USB-compatible memory, or any other medium that can be used to store information and that can be accessed by device 300. Memory 304 may comprise executable instructions that, when executed by processor 302, cause processor 302 to effectuate operations to, e.g., select or receive paint tinting information, control electromechanical components, process payment, and/or perform other aspects described herein.

Figure 4:
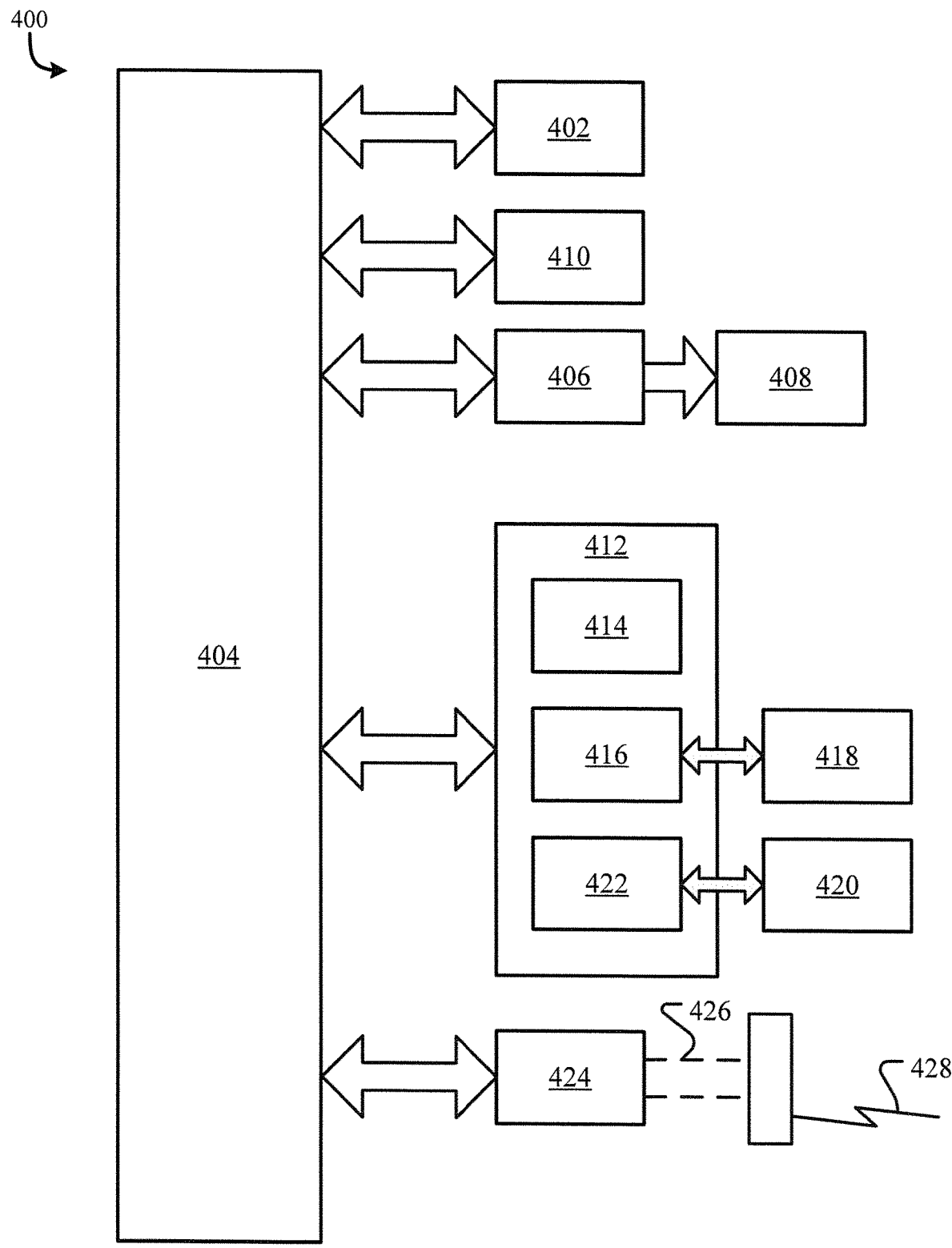
FIG. 4 is a block diagram of an example computer system that may be used to implement at least a portion of the disclosures herein.

FIG. 4 illustrates a computer-based system 400 that may constitute or include parts of one or more of systems 100, 200, 250, and/or 300. Computer-based system 400 includes at least one processor, such as a processor 402. Processor 402 may be connected to a communication infrastructure 404, for example, a communications bus, a cross-over bar, a network, or the like. Various software aspects are described in terms of this example computer-based system 400. Upon perusal of the present description, it will become apparent to a person skilled in the relevant art(s) how to implement the present disclosure using other computer systems or architectures.

Computer-based system 400 includes a display interface 406 that forwards graphics, text, or other data from communication infrastructure 404 or from a frame buffer (not shown) for display on a display unit 408.

Computer-based system 400 further includes a main memory 410, such as random access memory (RAM), and may also include a secondary memory 412. Secondary memory 412 may further include, for example, a hard disk drive 414 or a removable storage drive 416, representing a floppy disk drive, a magnetic tape drive, an optical disk drive, et cetera. Removable storage drive 416 reads from or writes to a removable storage unit 418 in a well-known manner. Removable storage unit 418 may represent a floppy disk, magnetic tape, or an optical disk, and may be read by and written to by removable storage drive 416. As will be appreciated, removable storage unit 418 includes a computer usable storage medium having computer software or data stored therein.

In accordance with various aspects of the present disclosure, secondary memory 412 may include other similar devices for allowing computer programs or other instructions to be loaded into computer-based system 400. Such devices may include, for example, a removable storage unit 420 and an interface 422. Examples of such may include a program cartridge and cartridge interface (such as that found in video game devices), a removable memory chip (such as an erasable programmable read only memory (EPROM), or programmable read only memory (PROM)) and associated socket, and other removable storage units and interfaces, which allow software and data to be transferred from removable storage unit 420 to computer-based system 400.

Computer-based system 400 may further include communication interface 424. Communication interface 424 may allow software or data to be transferred between computer-based system 400 and external devices. Examples of communication interface 424 include, but may not be limited to a modem, a network interface (such as an Ethernet card), a communications port, a Personal Computer Memory Card International Association (PCMCIA) slot and card, or the like. Software or data transferred via communication interface 424 may be in the form of a number of signals, hereinafter referred to as signals 426, which may be electronic, electromagnetic, optical or other signals capable of being received by communication interface 424. Signals 426 may be provided to communication interface 424 via a communication path (e.g., channel) 428. Communication path 428 carries signals 426 and may be implemented using wire or cable, fiber optics, a telephone line, a cellular link, a radio frequency (RF) link, or other communication channels.

In this document, the terms "computer program medium" and "computer usable medium" are used to generally refer to media such as removable storage drive 416, a hard disk installed in hard disk drive 414, or the like. These computer program products provide software to computer-based system 400. The present disclosure is directed to such computer program products.

Computer programs (also referred to as computer control logic) may be stored in main memory 410 or secondary memory 412. The computer programs may also be received via communication interface 404. Such computer programs, when executed, enable computer-based system 400 to perform the functions consistent with the present disclosure, as discussed herein. In particular, the computer programs, when executed, enable processor 402 to perform the features of the present disclosure. Accordingly, such computer programs represent controllers of computer-based system 400.

In accordance with an aspect of the present disclosure, where the disclosure is implemented using a software, the software may be stored in a computer program product and loaded into computer-based system 400 using removable storage drive 416, hard disk drive 414, or communication interface 424. The control logic (software), when executed by processor 402, causes processor 402 to perform the functions of the present disclosure as described herein.

In another aspect, the present disclosure is implemented primarily in hardware using, for example, hardware components, such as application specific integrated circuits (ASIC). Implementation of the hardware state machine to perform the functions described herein will be apparent to persons skilled in the relevant art(s). In yet another aspect, the present disclosure is implemented using a combination of both the hardware and the software. In another aspect, the present disclosure is implemented using software.

Figure 5:
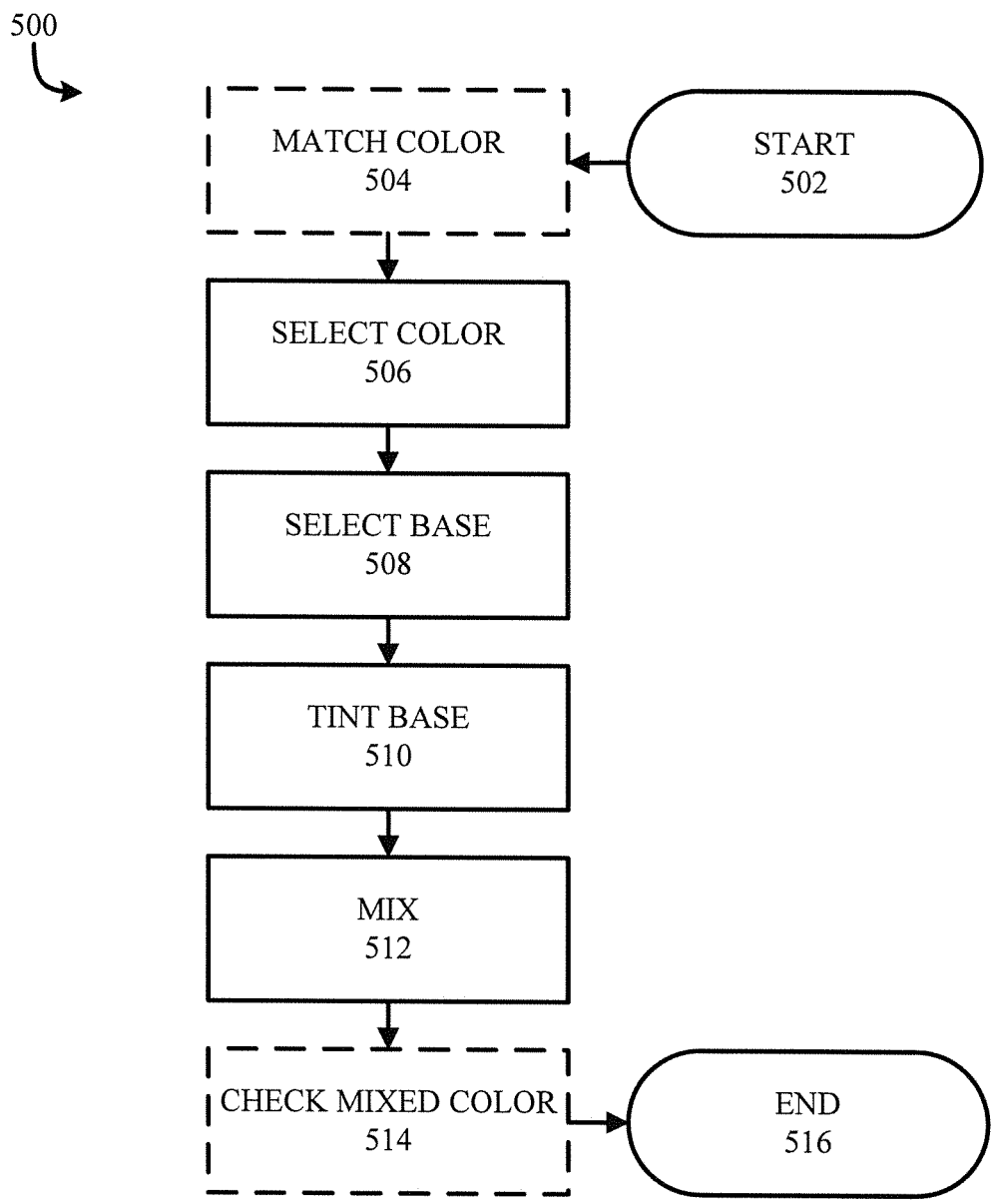
FIG. 5 is a flow chart of an example methodology for implementing at least a portion of the disclosures herein.

FIG. 5 illustrates an example methodology 500 in accordance with the disclosures herein. Methodology 500 begins at 502 and proceeds to 504 where, in embodiments, a color can be matched. This can be accomplished using various machine vision or camera technology which allows for consistent capture of colors for automated or semi-automated matching. At 506, a color is selected, either automatically or manually (which may or may not be based on a color match from 504). The color selection can be provided to various self-service or other systems using electronic communication or by way of sensors, readers, entry by way of an interface, and so forth.

At 508, a base is selected. Bases can include base paints having different material properties. Base selection can be completed automatically, semi-automatically, or manually. In embodiments, the base is selected by physically transporting a container of base through the process. In embodiments, the base is provided at a later point or from a reservoir collocated with colorant for tinting or other elements. In embodiments, a container of base can be automatically conveyed using mechanisms.

At 510, the base is tinted. Colorant can be added in appropriate amounts to provide components which, when mixed, will yield the desired paint color. At 512 the base and colorant can be mixed to evenly distribute the colorant throughout the base and provide consistent paint color.

At 514, in embodiments, the mixed color can be checked to determine it matches the intended color. This can be done automatically using mechanisms and machine vision or manually by way of a user taking a paint sample. Thereafter, at 516, methodology 500 ends.

The embodiment illustrated in FIG. 5 is provided for explanatory purposes, but it is understood alternative methodologies can exclude illustrated aspects, include additional aspects, re-order aspects, and include various determinations which may recycle to or skip aspects based on the outcome of determinations. One or more aspects of methodology 500 can be performed by one or more machines, kiosks, stations, et cetera, or combinations of two or more and/or customer interaction as disclosed herein.

Figure 6A:
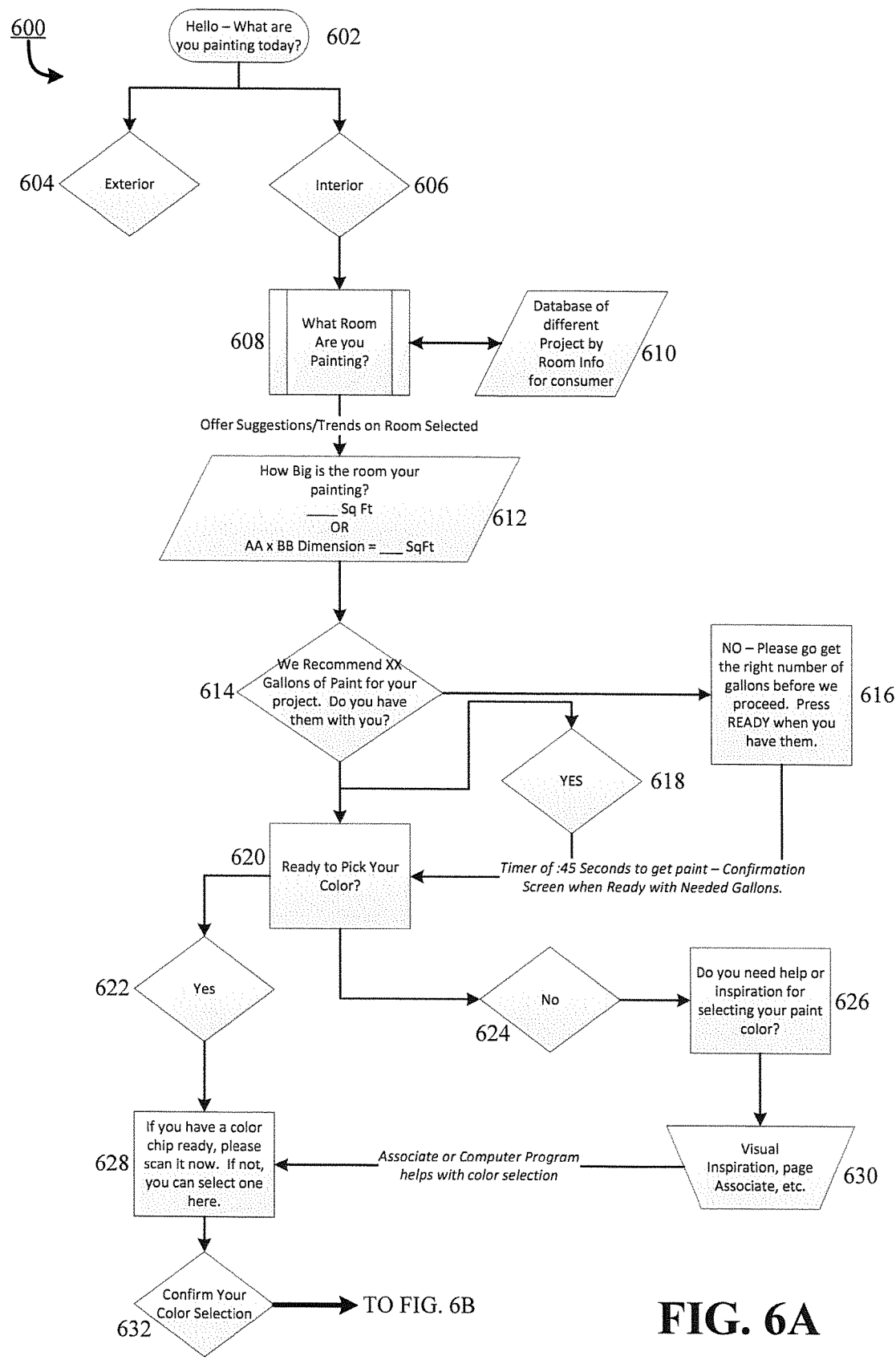
FIGS. 6A to 6C illustrate an example methodology for providing self-service paint tinting.
Figure 6B:
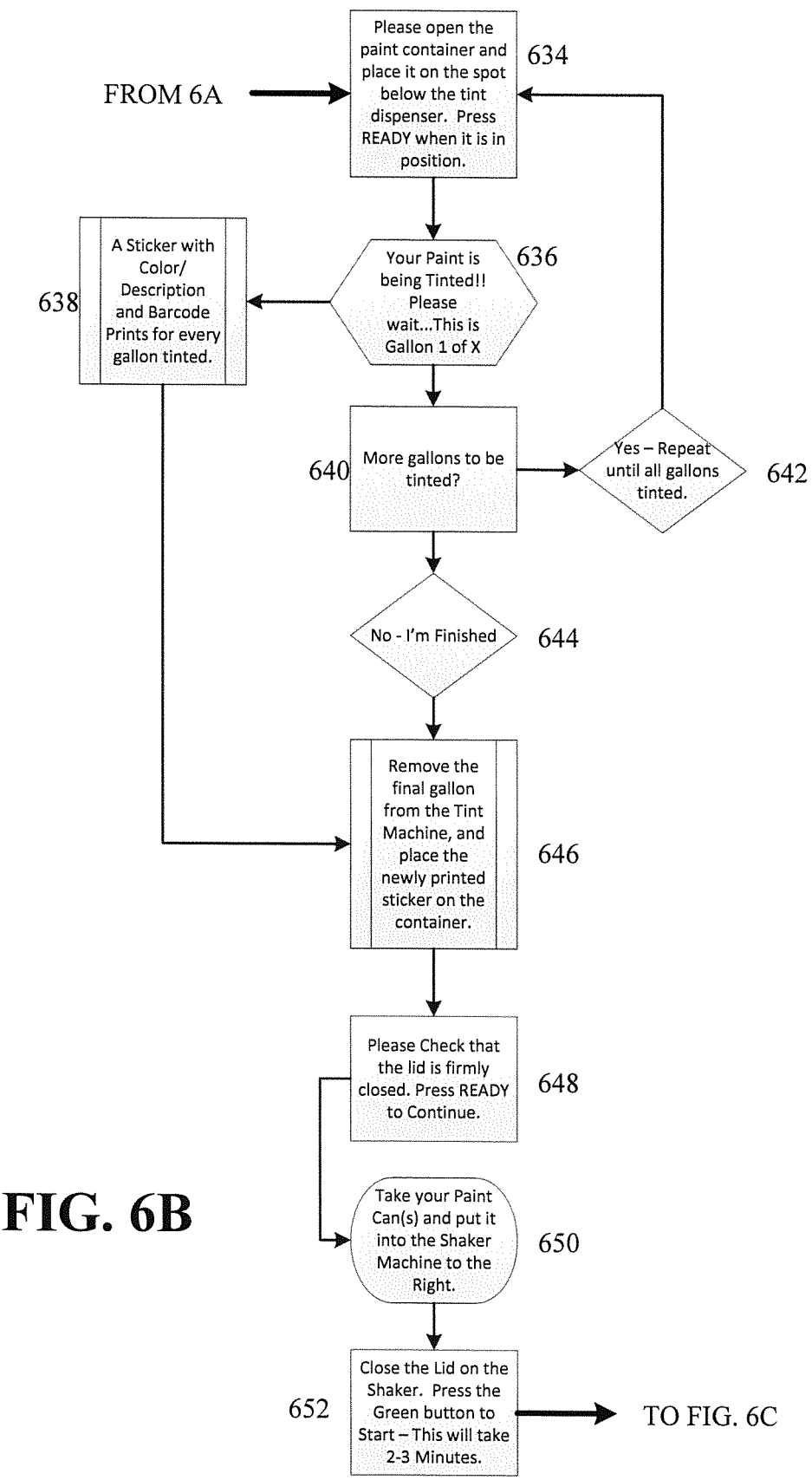
Figure 6C:
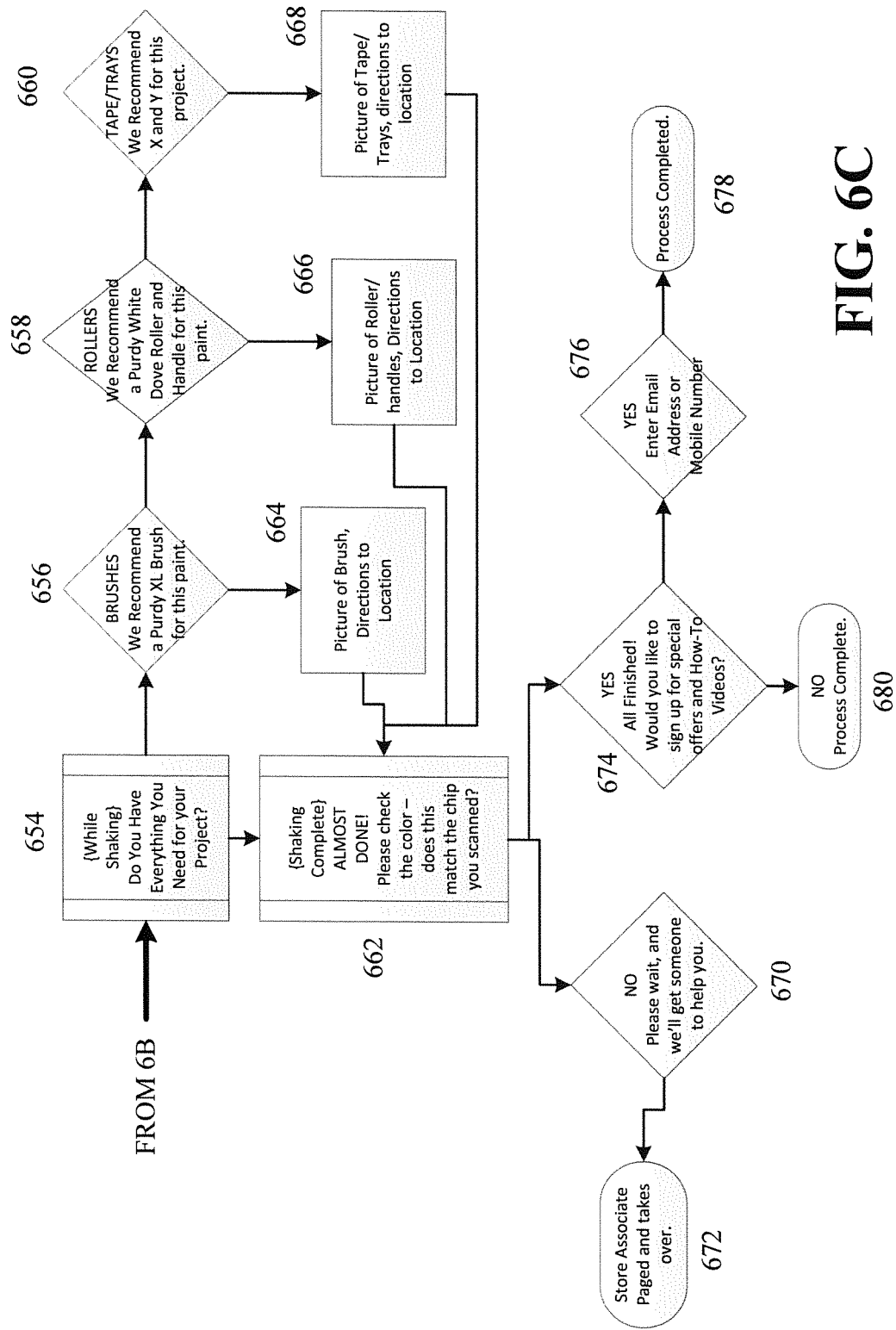

FIGS. 6A, 6B, and 6C illustrate an example methodology 600 for providing self-service paint tinting. Specifically, methodology 600 illustrates an example embodiment of a user-friendly guided method which can be implemented in software, hardware, or combinations thereof to collect information required to transmit paint information (e.g., color, base, other characteristics) to one or more paint mixing kiosks to deliver custom-mixed paint on demand to a customer in an automated, self-help fashion. Methodology 600 begins at 602 where the customer is asked what they are painting. If interior, methodology 600 proceeds to 606 then 608. If exterior, methodology 600 proceeds to 604, which can include a flow substantially similar to that proceeding from 606. Interior or exterior indications will be used to determine particular paint qualities based on the intended application and needs. In embodiments, regional information (e.g., weather range) can be used to assist in identifying paint survivability needs based on the location of the user or kiosk.

At 608, the user is asked what room (or item, wall, et cetera) they are painting. A project database including examples and suggestions can be provided by 610 to assist the user with developing concepts and color options. Thereafter (or alternatively or simultaneously) the user is asked the size of the room painted, which is used to determine both the volume of paint to be provided as well as needs (e.g., larger rooms may be more suited to certain finishes than smaller rooms). At 614, a recommendation is made for an amount of paint to purchase. The amount of paint can be approved or another amount entered, and thereafter a check can be conducted to determine whether the needed amount of paint is available. The needed amount of paint can be automatically determined or determined in response to human input. If automatically determined, a check of a reservoir and empty containers available can be conducted, or a check of filled containers accessible to a tinting apparatus can be conducted. If handling of containers is conducted manually, the user can be asked whether they have sufficient containers (filled or empty, depending on whether base is provided by the machine) available. If no, at 616, a message and timer can be provided to allow for collection or replenishment, or the device can be placed into a standby mode pending service. In embodiments, checks of available base (or other components such as tint) can be conducted earlier in methodology 600 to prevent the process from starting when insufficient resources are available. If adequate paint is available as determined at 618, or in certain embodiments after 614, methodology 600 can proceed to 620. At 620, a determination is made as to whether the user is ready to select a color for the paint. If not, methodology 600 proceeds to 624 and at 626 questions can be asked to assist with color selection. At 630, various examples or pictures can be provided to assist with selection. Thereafter, or if it is determined that a color is selected at 622, at 628 a color can be input using, e.g., a chip, barcode, RFID, et cetera, to ensure correct color selection. Thereafter at 632 the color selection can be confirmed.

Continuing (to FIG. 6B) at 634 an instruction is provided to arrange a container of base. In embodiments differing from that illustrated, an empty container can be placed for base dispensing, or an empty or base-holding container can be automatically provided using various mechanisms. At 636, an instruction that the paint is being tinted, including an indication of progress where multiple containers are being filled, is provided. At 638, labels or stickers can be printed, or other action can be taken to assist with storing the tinting history and facilitating payment for the paint. At 640, a determination is made as to whether more containers will be tinted. If it is determined that more containers are required at 642, methodology 600 recycles to 634. If all containers are filled, an indication that the job is finished at 644 advances methodology 600 to 646 where the tinted paint can be removed and labeled. After sealing the container (in embodiments using a mix shaker), which can be confirmed at 648, the tinted container can be taken to a mixing machine to distribute the colorant throughout the base. At 652 an instruction is provided to prepare the mixing apparatus and start the process. In various embodiments, opening or closing the container, opening or closing a mixing apparatus, conveying the container (or leaving the container in place for a combined tinting and mixing machine) can be performed using varying levels of automation. Such action can be performed while informing the user of the status, or without user interaction.

Continuing (to FIG. 6C), at 654, during the shaking process, a user can be asked whether they have all necessary equipment and accessories for their painting project. If uncertain or no, at 656 they can be asked about, e.g., brushes; at 658 they can be asked about rollers; at 660 they can be asked about tape or trays; et cetera. The recommendations can include particular offerings associated with the paint manufacturer or store. At 664, 666, and 668, pictures of recommended items or indications of where to locate the items can be provided. Alternatively or complementarily the equipment or accessories can be automatically provided by a mechanical apparatus or picked for availability at checkout. At 662, which can occur after reviewing equipment or accessories or if the question at 654 is answered in the negative, an indication of completed mixing can be provided and a color check can be conducted. If the color is determined not to match at 670 assistance can be rendered at 672 or some or all of methodology 600 can be repeated to correct or reattempt the process. If the paint color is determined to be a proper match, at 674 a signup offer can be provided, which can be entered at 676 before completing the process at 678, or if the response at 674 is negative methodology 600 can terminate at 680.

While methodology 600 describes a particular process using a particular arrangement of hardware and software, and a particular combination of manual and automated action, it is understood that greater or lower amounts of automation or kiosk consolidation can be implemented in accordance with aspects disclosed herein.

Figure 7B:
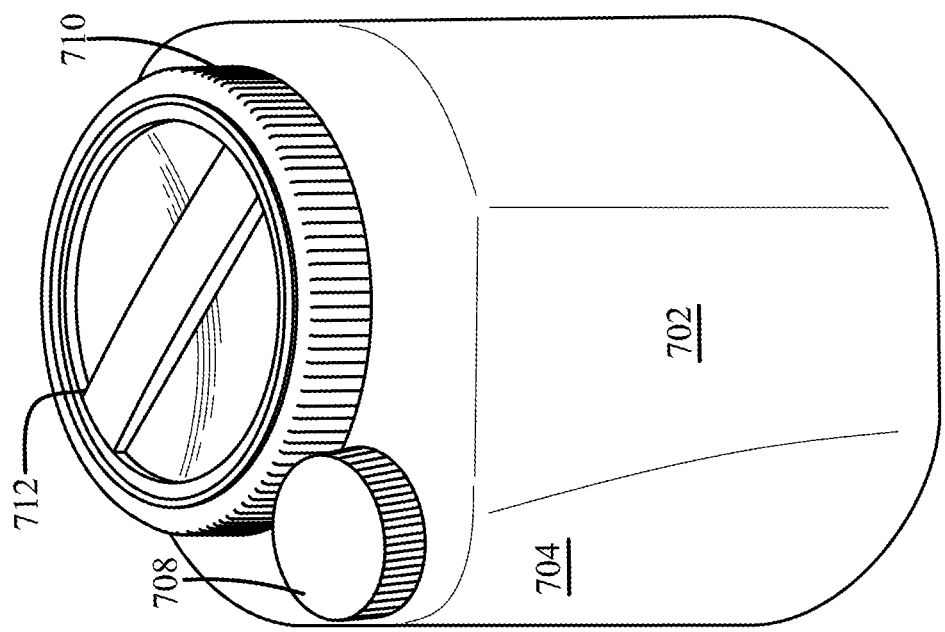
FIGS. 7A to 7E illustrate an example of packaging for fluids such as paint.
Figure 7A:
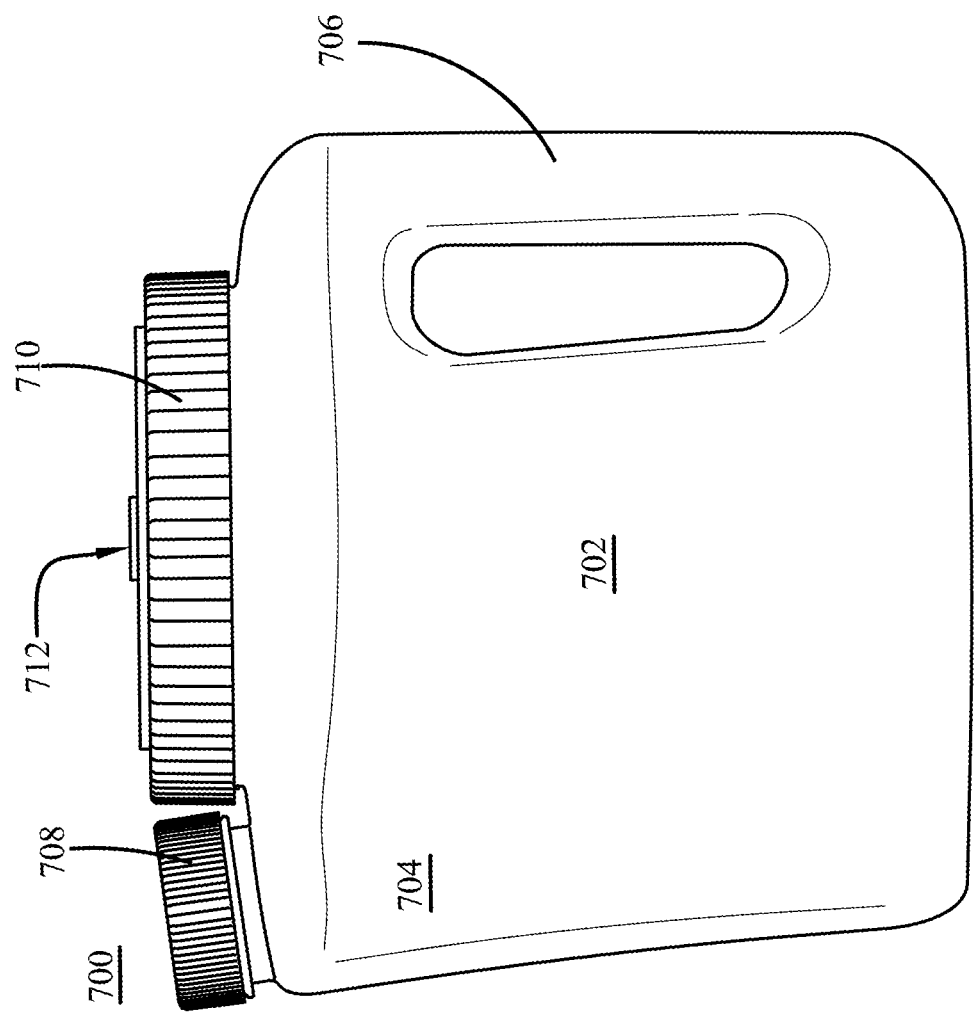
Figure 7D:
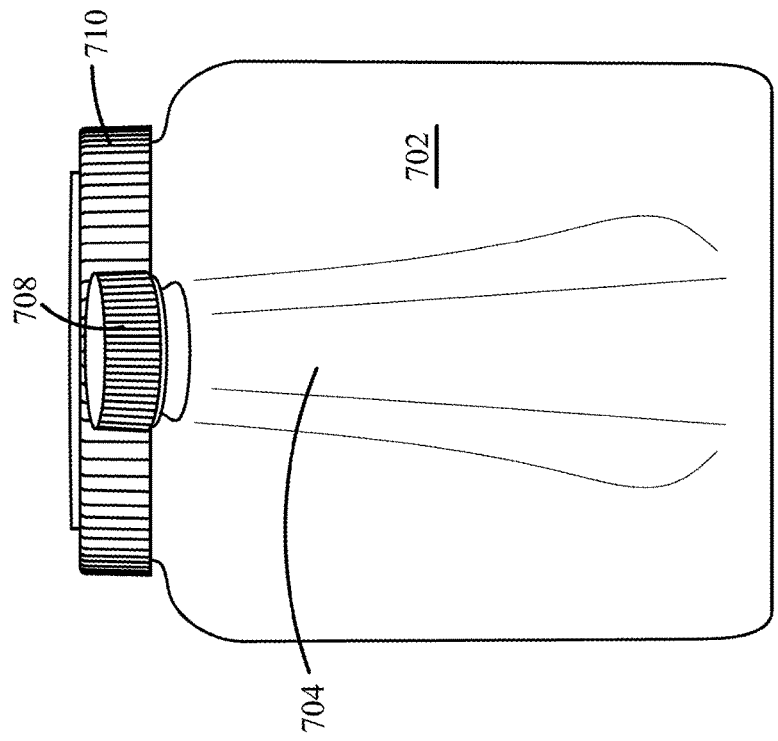
Figure 7C:
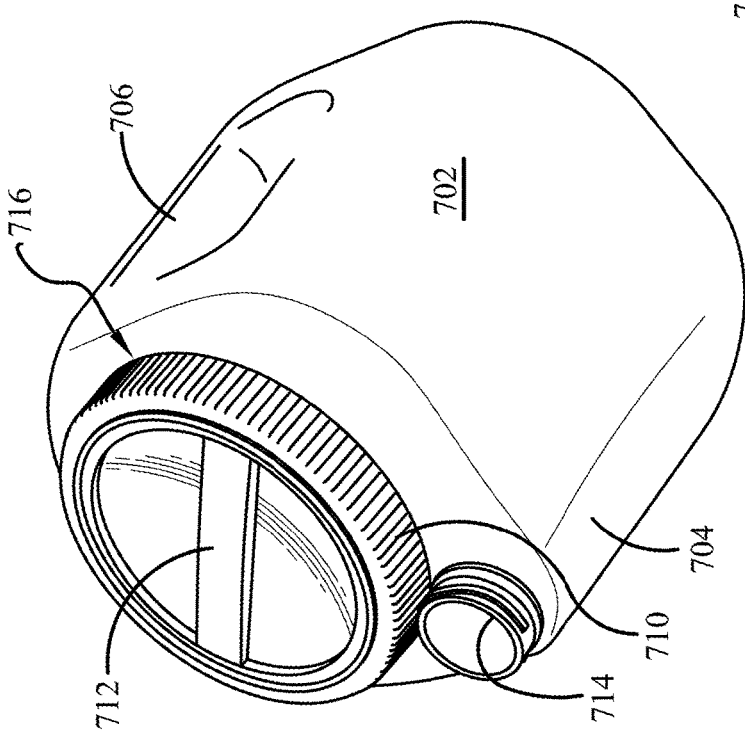
Figure 7E:
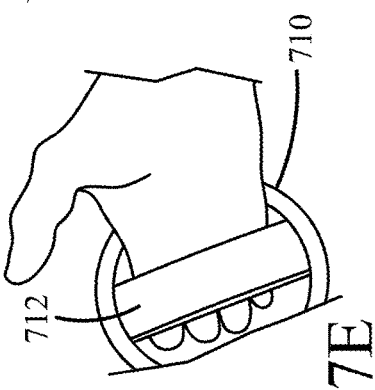

FIGS. 7A to 7E illustrate an example of packaging 700 for fluids such as paint. In particular, FIGS. 7A to 7D illustrate containers and aspects thereof, and FIG. 7E illustrates a lid or cap which can be used in conjunction with the containers of FIGS. 7A to 7D.

Packaging 700 includes reservoir 702, spout extension 704, integral grip 706, spout cap 708, aperture cap 710, cap grip 712, spout opening 714, and aperture 716. Reservoir 702 defines a body sized and shaped to contain a volume of fluid, e.g., a gallon of paint, a quart of paint, a pint of paint, other standard or custom volumes, et cetera. In embodiments, reservoir 702 and other portions are sized and shaped to fit in standard paint can storage spaces such as, e.g., shelves, boxes, mixing machines, et cetera. Spout extension 704 can angle outward of the uniform contour of reservoir 702 to permit controlled pouring of fluid from spout opening 714. Integral grip 706 is formed into reservoir 702 to allow handling of packaging 700 using a secure interface that is robust and expands the capacity of packaging 700. Spout cap 708 and aperture cap 710 can be threaded to make for easy attachment and removal, and include texturing to assist with grip and twisting. Spout opening 714 can be opened to allow slow pouring, and spout extension 704 can be angled to an angle that allows opening of aperture 716 to facilitate airflow, and easy fluid flow, without spillage from aperture 716 while pouring from spout opening 714. Aperture 716 can be large enough to provide, e.g., clearance for a paintbrush or other applicator. Aperture cap 710 can include cap grip 712, which can be used for tightening or loosening aperture cap 710 and/or for vertical carriage of packaging 700. Aperture cap 710 can include a recess below cap grip 712 to allow for more positive grasping. In embodiments, cap grip 712 or other elements can be configured to allow for automated handling by mechanical actuators to open and close packaging 700 and/or handle and move packaging 700.

Various aspects disclosed herein are to be taken in the illustrative and explanatory sense, and should in no way be construed as limiting of the present disclosure. All numerical terms, such as, but not limited to, "first" and "second" or any other ordinary or numerical terms, should also be taken only as identifiers, to assist the reader's understanding of the various aspects, variations, components, or modifications of the present disclosure, and may not create any limitations, particularly as to the order, or preference, of any aspect, variation, component or modification relative to, or over, another aspect, variation, component or modification.

It is to be understood that individual features shown or described for one aspect may be combined with individual features shown or described for another aspect. The above described implementation does not in any way limit the scope of the present disclosure. Therefore, it is to be understood although some features are shown or described to illustrate the use of the present disclosure in the context of functional segments, such features may be omitted from the scope of the present disclosure without departing from the spirit of the present disclosure as defined in the appended claims.

The present disclosure is described herein with reference to system architecture, block diagrams, flowchart illustrations of methods, and computer program products according to various aspects of the disclosure. It will be understood that each functional block of the block diagrams and the flowchart illustrations, and combinations of functional blocks in the block diagrams and flowchart illustrations, respectively, can be implemented by computer program instructions.

These software elements may be loaded onto a general-purpose computer, special-purpose computer, or other programmable data processing apparatus to produce a machine, such that the instructions that execute on the computer or other programmable data-processing apparatus create means for implementing the functions specified in the flowchart block or blocks. These computer program instructions may also be stored in a computer-readable memory that can direct a computer or other programmable data-processing apparatus to function in a particular manner, such that the instructions stored in the computer-readable memory produce an article of manufacture including instruction means that implement the function specified in the flowchart block or blocks. The computer program instructions may also be loaded onto a computer or other programmable data-processing apparatus to cause a series of operational steps to be performed on the computer or other programmable apparatus to produce a computer-implemented process, such that the instructions that execute on the computer or other programmable apparatus provide steps for implementing the functions specified in the flowchart block or blocks. In an aspect, the computer program instructions may be executed on any remote-hosted application framework, for example, by a processor associated with a cloud server.

Accordingly, functional blocks of the block diagrams and flow diagram illustrations support combinations of means for performing the specified functions, combinations of steps for performing the specified functions, and program instruction means for performing the specified functions. It will also be understood that each functional block of the block diagrams and flowchart illustrations, and combinations of functional blocks in the block diagrams and flowchart illustrations, can be implemented by either special purpose hardware-based computer systems which perform the specified functions or steps, or suitable combinations of special purpose hardware and computer instructions. Further, illustrations of the process flows and the descriptions thereof may make reference to user windows, web pages, websites, web forms, prompts, et cetera. Practitioners will appreciate that the illustrated steps described herein may comprise in any number of configurations including the use of windows, web pages, hypertexts, hyperlinks, web forms, popup windows, prompts, and the like. It should be further appreciated that the multiple steps as illustrated and described may be combined into single web pages and/or windows but have been expanded for the sake of simplicity. In other cases, steps illustrated and described as single process steps may be separated into multiple web pages and/or windows but have been combined for simplicity.

The systems, methods and computer program products disclosed in conjunction with various aspects of the present disclosure are embodied in systems and methods for facilitating multiple types of communications via a network-based portal.

While aspects of the present disclosure have been particularly shown and described with reference to the examples above, it will be understood by those skilled in the art that various combinations of the disclosed aspects or additional aspects may be contemplated by the modification of the disclosed machines, systems and methods without departing from the spirit and scope of what is disclosed. Such aspects should be understood to fall within the scope of the present disclosure as determined based upon the claims and any equivalents thereof.

What is claimed is:

1. A system, comprising:
a walkable path within a store;
a first kiosk on the walkable path within the store, the first kiosk having an electronic interface,
wherein the first kiosk is configured to receive a base selection and a color selection from a user using the electronic interface of the first kiosk, and wherein the base selection includes at least a gloss level;
a base array on the walkable path within the store comprising a plurality of containers of base, wherein each of the plurality of containers of base include encoding identifying a base specification within each of the containers;
a second kiosk on the walkable path within the store, the second kiosk operatively coupled with the first kiosk to receive the base selection and the color selection,
wherein the second kiosk receives one of the plurality of containers of paint base, wherein the second kiosk detects that the one of the plurality of containers matches the base selection based on the encoding, and
wherein the second kiosk is configured to tint the paint base with a colorant to a specification matching the color selection; and
a third kiosk configured to mix the paint base and the colorant.

2. A walkable path within a store, comprising:
a color selection kiosk comprising a camera system and a user interface,
wherein the camera system is configured to capture an image of a sample controlled for location, angle, and flash to determine a color match of the sample,
wherein the user interface is configured to display the color match, and wherein the user interface is configured to receive a color selection and one or more base quality selections;
a base selection kiosk comprising a plurality of containers of base, wherein each of the plurality of containers of base include encoding identifying a base specification within each of the containers;
a tinting kiosk communicably coupled with the color selection kiosk to receive the base selection and the color selection,
wherein the tinting kiosk receives one of the plurality of containers of paint base, wherein the tinting kiosk detects that the one of the plurality of containers matches the one or more base quality selections based on the encoding, and
wherein the tinting kiosk is configured to tint the paint base with a colorant to a specification matching the color selection; and
a mixing kiosk configured to seal the one of the plurality of containers after tinting the paint base, wherein the mixing kiosk is configured to mix the colorant and the paint base after sealing to produce mixed paint.

3. The walkable path of claim 2, further comprising a plurality of swatches of the color selection kiosk including encoding for scanning, wherein the color selection is based at least in part on scanning of at least one of the plurality of swatches.

4. The walkable path of claim 2, further comprising a mix camera of the mixing kiosk configured to collect an image of the mixed paint to confirm that the mixed paint matches at least the color selection.

5. The walkable path of claim 2, further comprising a mixing interface of the mixing kiosk, wherein the mixing interface is configured to facilitate checkout and payment for the mixed paint.

6. The walkable path of claim 2, further comprising a label printer of the mixing kiosk, wherein the label printer is configured to print a label identifying the mixed paint.

* * * * *